United States Patent
Canal et al.

(10) Patent No.: US 9,709,833 B2
(45) Date of Patent: Jul. 18, 2017

(54) SECURE DISPLAY DEVICE WITH TWISTED NEMATIC LIQUID CRYSTAL MATRIX

(71) Applicants: Laurent Canal, Merignac (FR); Dorian Santiago, Talence (FR)

(72) Inventors: Laurent Canal, Merignac (FR); Dorian Santiago, Talence (FR)

(73) Assignee: Thales, Neuilly sur Seine (FR)

( * ) Notice: Subject to any disclaimer, the term of this patent is extended or adjusted under 35 U.S.C. 154(b) by 949 days.

(21) Appl. No.: 13/711,562

(22) Filed: Dec. 11, 2012

(65) Prior Publication Data
US 2013/0155343 A1     Jun. 20, 2013

(30) Foreign Application Priority Data
Dec. 16, 2011 (FR) ...................... 11 03889

(51) Int. Cl.
 *G02F 1/13* (2006.01)
 *G09G 3/36* (2006.01)

(52) U.S. Cl.
CPC ......... *G02F 1/1309* (2013.01); *G09G 3/3648* (2013.01); *G09G 3/3666* (2013.01); *G09G 3/3696* (2013.01); *G09G 2310/0245* (2013.01); *G09G 2330/08* (2013.01); *G09G 2330/10* (2013.01); *G09G 2330/12* (2013.01)

(58) Field of Classification Search
CPC ........................................... G02F 1/1309
See application file for complete search history.

(56) References Cited

U.S. PATENT DOCUMENTS

| | | | |
|---|---|---|---|
| 5,874,933 A * | 2/1999 | Hirai et al. | ...................... 345/89 |
| 2010/0033465 A1 | 2/2010 | Canal et al. | |
| 2011/0074664 A1 | 3/2011 | Lebrun et al. | |
| 2011/0176071 A1 * | 7/2011 | Iisaka et al. | .................. 348/790 |

FOREIGN PATENT DOCUMENTS

| | | |
|---|---|---|
| EP | 2 151 810 A2 | 2/2010 |
| FR | 2 843 823 A1 | 2/2004 |
| WO | WO 2009/019253 A1 | 2/2009 |

OTHER PUBLICATIONS

French Search Report for Counterpart French Patent Application No. 1103889, 9 pgs. (Apr. 24, 2012).
China (R.O.C.) Patent Application No. 201210525732.3, Office Action and IPO Search Report, dated May 4, 2016, (6 pages).

* cited by examiner

*Primary Examiner* — Kent Chang
*Assistant Examiner* — Sepideh Ghafari
(74) *Attorney, Agent, or Firm* — Blakely, Sokoloff, Taylor & Zafman LLP

(57) ABSTRACT

The general field of the invention is that of the display devices that comprise an active liquid crystal matrix of twisted nematic type. The matrix comprises a set of pixels, a set of rows and of columns and an electronic control device. Each pixel is controlled by a transistor. The voltage applied to each control row is either a switch-on voltage VG_on sufficient to switch on the transistors, or a switch-off voltage VG_off sufficient to switch off the transistors. The voltage applied GMA to each column is dependent on the predetermined optical transmission of the pixel. The display device comprises means for detecting the correct operation of the electronic control device. In case of detection of incorrect operation, the display device comprises cut-off means arranged to force to zero the switch-off voltages VG_off of the rows and the GMA voltages of the columns, (Continued)

so that the transmission of all the pixels of the first set is minimum.

8 Claims, 5 Drawing Sheets

SECURE DISPLAY DEVICE WITH TWISTED NEMATIC LIQUID CRYSTAL MATRIX

BACKGROUND OF THE INVENTION

1. Field of the Invention

The field of the invention is that of cockpit displays in which the display devices comprise a liquid crystal matrix, also called "LCD", standing for "Liquid Crystal Display". These display screens are nowadays tilted in all types of fixed or revolving wing aircraft in both civilian and military domains.

2. Description of the Prior Art

An LCD screen operates on the principle of matrix addressing. As can be seen in FIG. 1, the LCD screen is made up of coloured individual pixels organized in a matrix. Six pixels P are represented in FIG. 1 with different shades of grey representing the colours of the pixels. Each pixel P is made up of a thin thickness of liquid crystal contained between two electrodes, a first so-called control electrode and a second, back electrode B, called "backplane", common to all the matrix and symbolized by ellipses in FIG. 1. The potential difference or ddp between the electrodes is controlled by a so-called "TFT" (thin film transistor) transistor. This potential difference acts on the orientation of the liquid crystal molecules and therefore on their light transmission. Each transistor TFT is located at the intersection of a row L and of a control column C. The gate G of each transistor TFT is linked to a particular row and the drain D to a particular column.

A video image generator drives, through electronic circuits called drivers, the transistors TFT located at the intersection of the different rows and of the different columns according to the image to be displayed. The drivers are organized as "row drivers" and as "column drivers".

The column drivers receive the video information to be displayed which is validated by the row drivers. The column drivers convert the digital information from the video generator into analogue voltages proportional to the voltage references called "GMA", standing for GamMA voltage. These voltages are applied to the drains D of the transistors TFT.

The row drivers apply to the gates G of the TFTs of one and the same row a line switch-on voltage "VG_on" in order to apply to the liquid crystal the analogue voltages supplied by the column drivers, the other rows being kept switched off by the row switch-off voltage "VG_off". Once the row is written, the column drivers present the new analogue voltages and the row drivers switch on the next row, and so on for all the rows of the matrix screen.

The LCD screens used are generally based on the so-called "twist nematic" (TN) technology because it offers the advantage of offering more optical transmission than the other technologies.

FIGS. 2a and 2b represent, as a function of the time t, the voltages applied in volts in two configurations of use. In the first, so-called "BLACK LCD", configuration, the liquid crystal is opaque; in the second, so-called "WHITE LCD", it is transparent. The "backplane" voltage represented by a dotted line in FIGS. 2a and 2b is continuous and set at around 6 volts. In both cases, in order not to create a marking, the liquid crystal receives an alternately positive then negative DDP corresponding to the "positive phases" and "negative phases" of FIGS. 2a and 2b.

In the first configuration represented in FIG. 2a, the liquid crystal is opaque if the DDP is greater than 4 volts. The column voltages then vary between 0 and 12 volts, that is to say by ±6 volts around the 6 volt backplane voltage.

In the second configuration, represented in FIG. 2b, the liquid crystal is transparent if the DDP is virtually zero or less than 1 volt. The column voltages then vary between 5 and 7 volts, that is to say ±1 volt around the 6 volt backplane voltage.

The drawback of this technology is that it naturally presents a white screen that is said to be "normally white" when the latter is defective or uncontrolled. This white screen with strong brightness compared to a traditional display with dark background of the "PFD" (primary flight display) can be a nuisance to the pilot.

FIG. 3 represents a set of two dual displays denoted LCD1 and LCD2. The expression "dual display" should be understood to mean a display comprising a single LCD matrix arranged in such a way as to display two totally independent or segregated images. More specifically, a dual display comprises two independent power supplies, two independent light boxes, two independent graphic generations and two independent sets of row and column drivers. Thus, a first failure of any kind does not result in the total loss of the display device. In FIG. 3, the left hand display LCD1 is perfectly functional and presents two displays denoted $D1_G$ and $D1_D$. The left hand part $D2_G$ of the right hand display LCD2 has failed and displays a white screen. Only the right hand part $D2_D$ is operational.

So as to restore a black screen, the failure of this type of screen results either in the automatic switching off of the light box which lights the matrix so as to restore a black screen, or the manual switching off of the equipment by the pilot. This switching off results in the complete loss of the equipment. This outcome is highly detrimental in the case of a dual display presenting two different and independent display types because it causes the loss of the second display, thus disrupting the screen reconfigurations needed to satisfy the aircraft certification and safety constraints.

SUMMARY OF THE INVENTION

The device according to the invention does not present these drawbacks. It makes it possible to force a black display on an LCD screen of twisted nematic type even if the latter is no longer controlled after, for example, a failure of the row drivers or of the column drivers. In the case of use of a dual screen, the device according to the invention also makes it possible to keep the second display operational without the pilot being hampered by the failed display that has become white. Thus, neither the system nor the pilot has to be concerned with the failure of the LCD. The device according to the invention therefore has a dual action: to not present an erroneous image and to avoid hampering the pilot.

More specifically, the subject of the invention is a display device (e.g., as shown in FIG. 7) comprising an active liquid crystal matrix of twisted nematic type, said matrix comprising a first set of pixels, a first set of rows and of columns and a first electronic control device 701;

each pixel being controlled by a transistor comprising a source, a drain and a gate, the gate being linked to a row, the drain to a column and the source to the control electrode of the pixel;

the voltage applied to each control row being either a switch-on voltage VG_on sufficient to switch on the transistors, or a switch-off voltage VG_off sufficient to switch off the transistors;

the GMA voltage applied to each column being dependent on the predetermined optical transmission of the pixel;

the display device comprising first means 702 for detecting the correct operation of the first electronic control device 701, characterized in that, in case of detection of incorrect operation of the first electronic control device, the display device comprises first cut-off means arranged to force to zero the switch-off voltages VG_off of the rows and the GMA voltages of the columns, so that the transmission of all the pixels of the first set of pixels is minimum.

Advantageously, the device is dual (e.g., as shown in FIG. 8), that is to say that the liquid crystal matrix comprises:

a second set of pixels, a second set of rows and of columns, a second electronic control device 801, second detection means 802 and second cut-off means independent of the first set of pixels, of rows, of columns, of the first electronic control device and of the first cut-off means.

Advantageously, the cut-off means are transistors arranged between the power supply circuits of the rows and of the columns and the electrical ground, said transistors being controlled by the first or the second correct operation detection means.

Advantageously, the correct operation detection means comprise:

either means for detecting fixed images, an image corresponding to all the GMA voltages applied to the different pixels during an individual display time;

or means for checking the current consumption of the rows and/or of the control columns.

BRIEF DESCRIPTION OF THE DRAWINGS

The invention will be better understood and other advantages will become apparent on reading the following description given as a nonlimiting example and using the appended figures in which.

DETAILED DESCRIPTION

Hereinafter, the same terms as previously have been adopted to designate the main elements of a display device.

The display device according to the invention conventionally comprises an active liquid crystal matrix of twisted nematic type comprising:

a first set of pixels, a first set of rows and of columns, a first electronic control device and first means for monitoring or detecting the correct operation of the first electronic control device;

each pixel being controlled by a transistor comprising a source, a drain and a gate, the gate being linked to a row, the drain to a column and the source to the control electrode of the pixel;

the voltage applied to each control row being either a switch-on voltage VG_on sufficient to switch on the transistors, or a switch-off voltage VG_off sufficient to switch off the transistors;

the GMA voltage applied to each column being dependent on the predetermined optical transmission of the pixel.

The display device also comprises electronics for monitoring the correct operation of the screen.

The display device according to the invention also comprises first cut-off means. The aim of these cut-off means is to equip the display device so that it is possible to obtain a black screen regardless of the control of the video generator and regardless of the state of the screen, whether functional or failed.

To perform this function, two actions are needed. Firstly, all the rows that are switched off must be switched on by forcing the switch-off voltage VG_off to zero volt. Thus, whatever the state of the row drivers, all the transistors TFT will leak and allow the analogue voltages presented by the column drivers to pass.

A second action is needed on the column drivers in order to apply, regardless of the video control, an analogue voltage that makes it possible to display black. This is done by forcing all the GMAs voltages to zero volt. Thus, the ddp seen by the liquid crystal is directly linked to the voltage applied to the backplane.

These actions are controlled by the electronics monitoring the correct operation of the screen. There are various technical principles that allow for such monitoring. A first example that can be cited are fixed image detection means, an image corresponding to all the GMA voltages applied to the different pixels during an individual display time. The fixed images are considered to be critical in avionics systems in as much as they can pass unseen by the crew for a certain time.

A second example that can also be cited are means for checking the electrical current consumption of the rows and/or of the control columns.

The result of this monitoring will on the one hand control the forcing to zero of the voltage VG_off and on the other hand collapse the GMAs voltages to force the screen to black.

It is also possible to force the voltage VG_on to zero so as not to see the row which is in the process of being written at the time of the failure.

Figure 4:
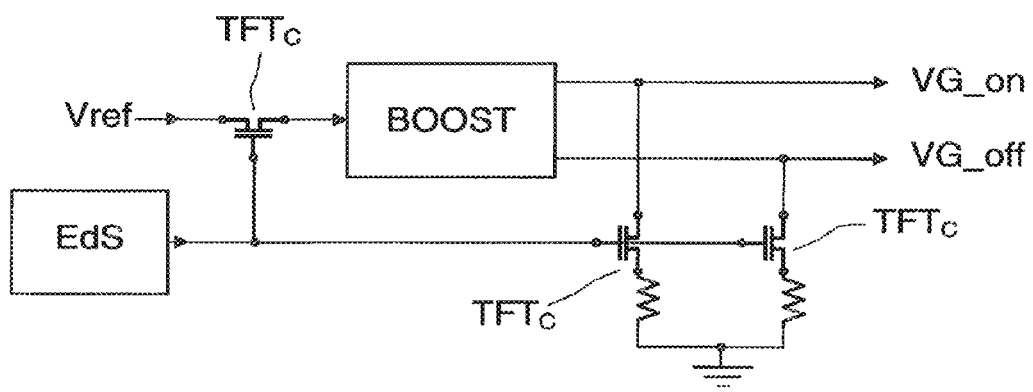
FIG. 4 represents an electrical schematic diagram of the row voltage cut-off means according to the invention.

As a first example, FIG. 4 represents the cut-off means to be implemented to carry out the function for resetting to zero the voltages VG_on and VG_off. These are generally obtained using a voltage "boost" converter as can be seen in FIG. 4. This "boost" converter simply has to be blocked in order to force these two voltages to zero volt. This is done by means of three transistors $TFT_C$, the first arranged at the input of the converter which isolates the converter from its power supply voltage $V_{REF}$, the other two on the two output channels VG_on and VG_off of the converter which are connected to the ground, which three transistors are controlled by the monitoring electronics EdS of the display device.

Figure 5:
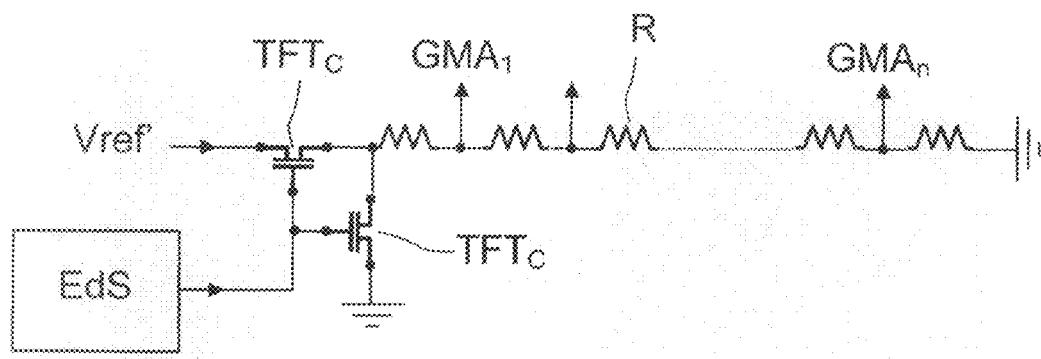
FIG. 5 represents an electrical schematic diagram of the column voltage cut-off means according to the invention.

As a second example, FIG. 5 represents the cut-off means to be implemented to perform the function for resetting to zero the GMAs voltages. These are produced by a resistor bridge R. The power supply voltage for this bridge is cut off by means of two transistors $TFT_C$ which isolate the resistor bridge from its power supply voltage $V_{REF}{}'$ and which connects the resistor bridge R to the ground. As previously, these two transistors are controlled by the monitoring electronics EdS of the display device.

These simple arrangements make it possible, by slightly modifying the basic electronics of an LCD screen, to be able to force a "normally white" TN LCD to display black and to do so regardless of the operational state of said screen.

This device still offers the advantage of never presenting an incorrect image to the pilot.

In the case of a single display, it makes it possible to minimize the visual nuisance to the pilot in as much as the display screen, even when failed, does not cause glare.

In the case of a dual display, the preceding cut-off means are duplicated for each display area. The system is no longer required to cut off all the equipment when just one of the displays is effected, as can be seen in FIG. 5 which uses the same notations as FIG. 3. The still-functional half-screen $D2_D$ of the display LCD2 is maintained, thus making it possible to retain the reconfiguration capabilities as demanded by the aeronautical safety requirements.

Figure 1:
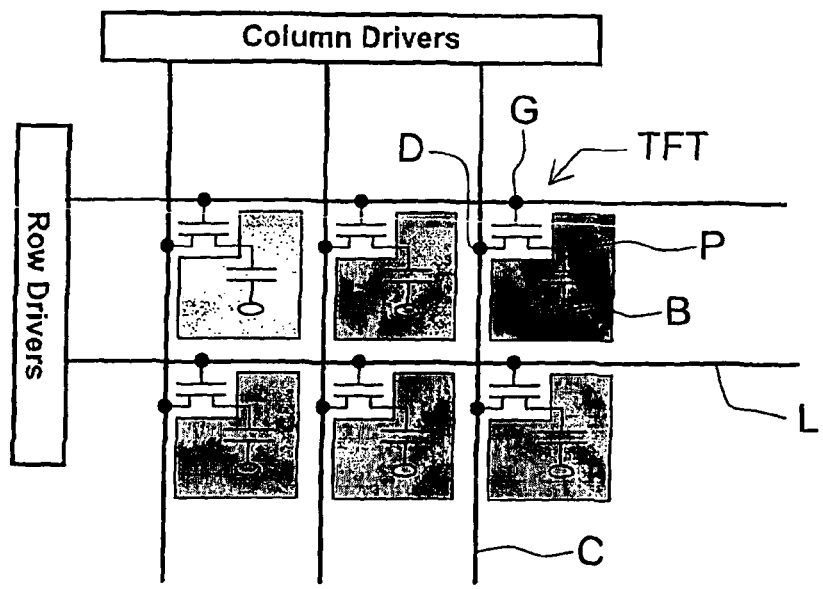
FIG. 1, already discussed, represents an arrangement of pixels of an active LCD matrix.
Figure 2A:
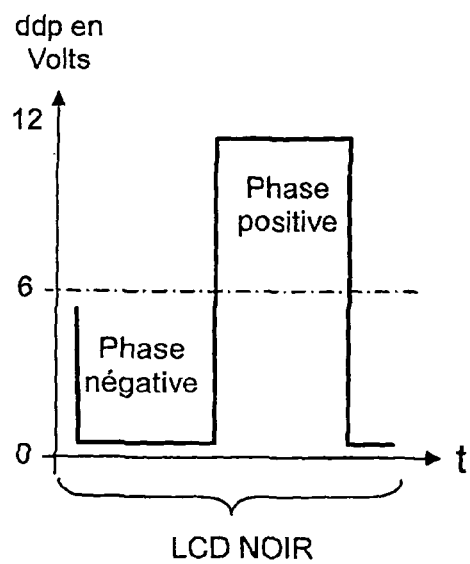
FIGS. 2a and 2b, also discussed, represent the variation of ddp in volts applied to a pixel to make it either transparent or opaque.
Figure 2B:
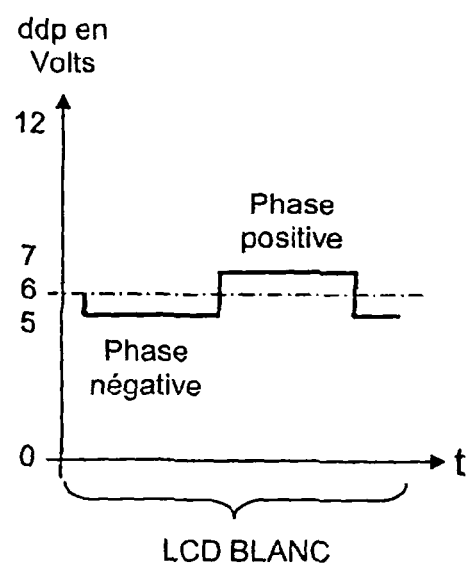
Figure 3:
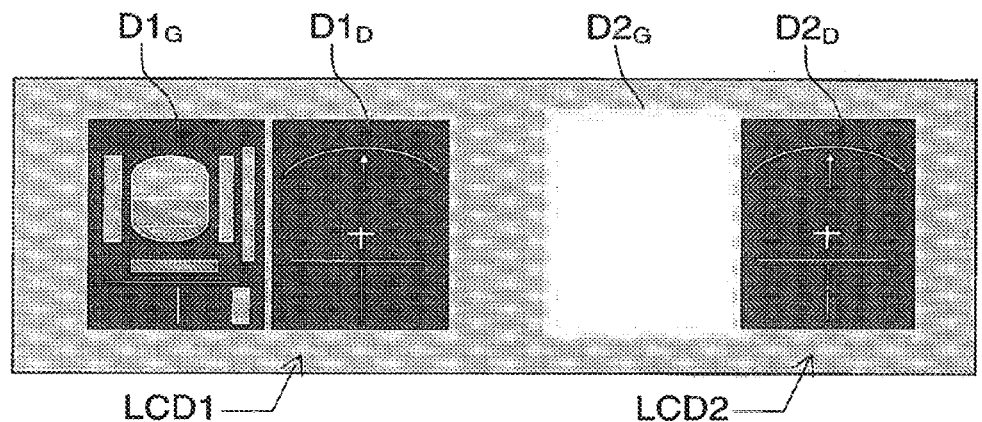
FIG. 3, previously discussed, represents a cockpit display system according to the prior art comprising two dual display devices, in which one of the displays has failed.
Figure 6:
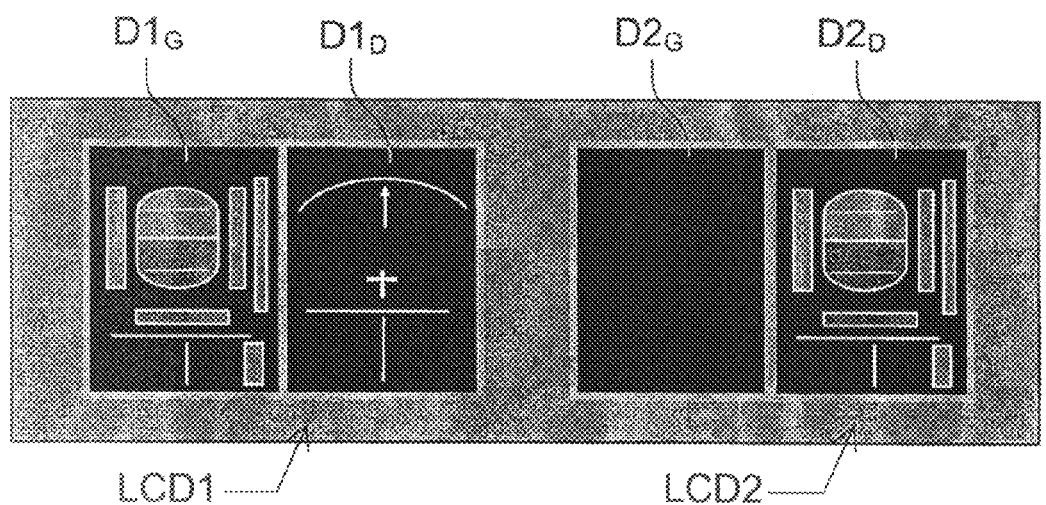
FIG. 6 represents a cockpit display system according to the invention comprising two dual display devices in which one of the displays has failed.
Figure 7:
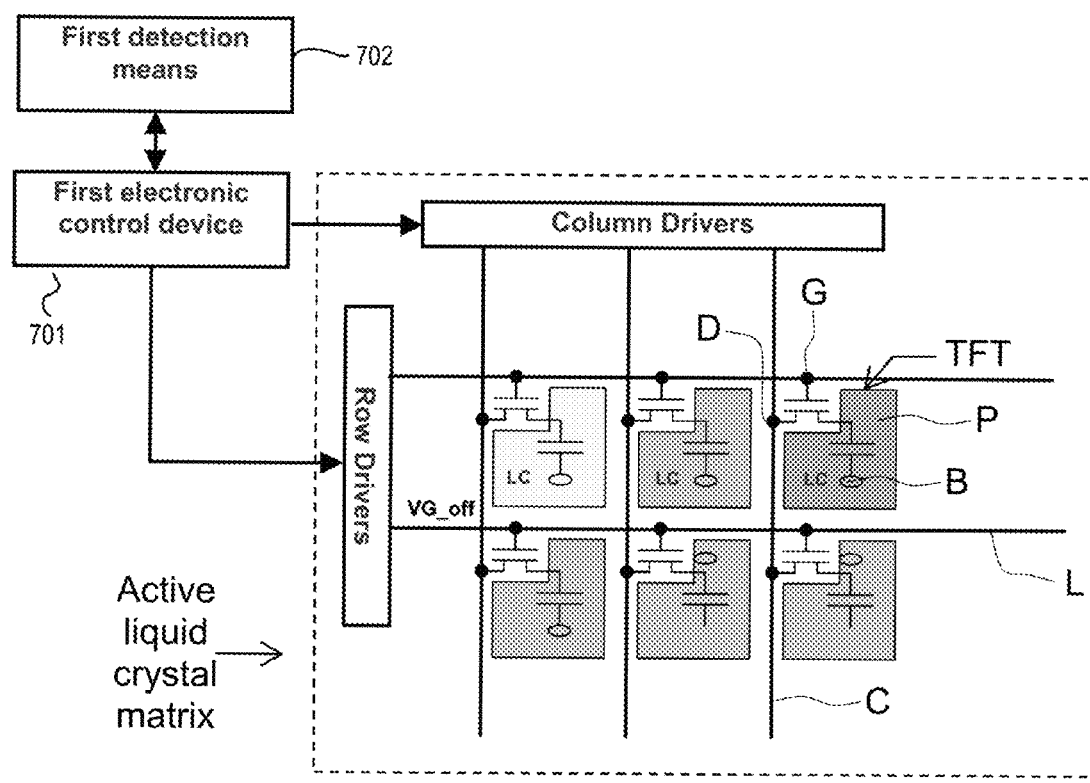
FIG. 7 shows a display device according to one embodiment.
Figure 8:
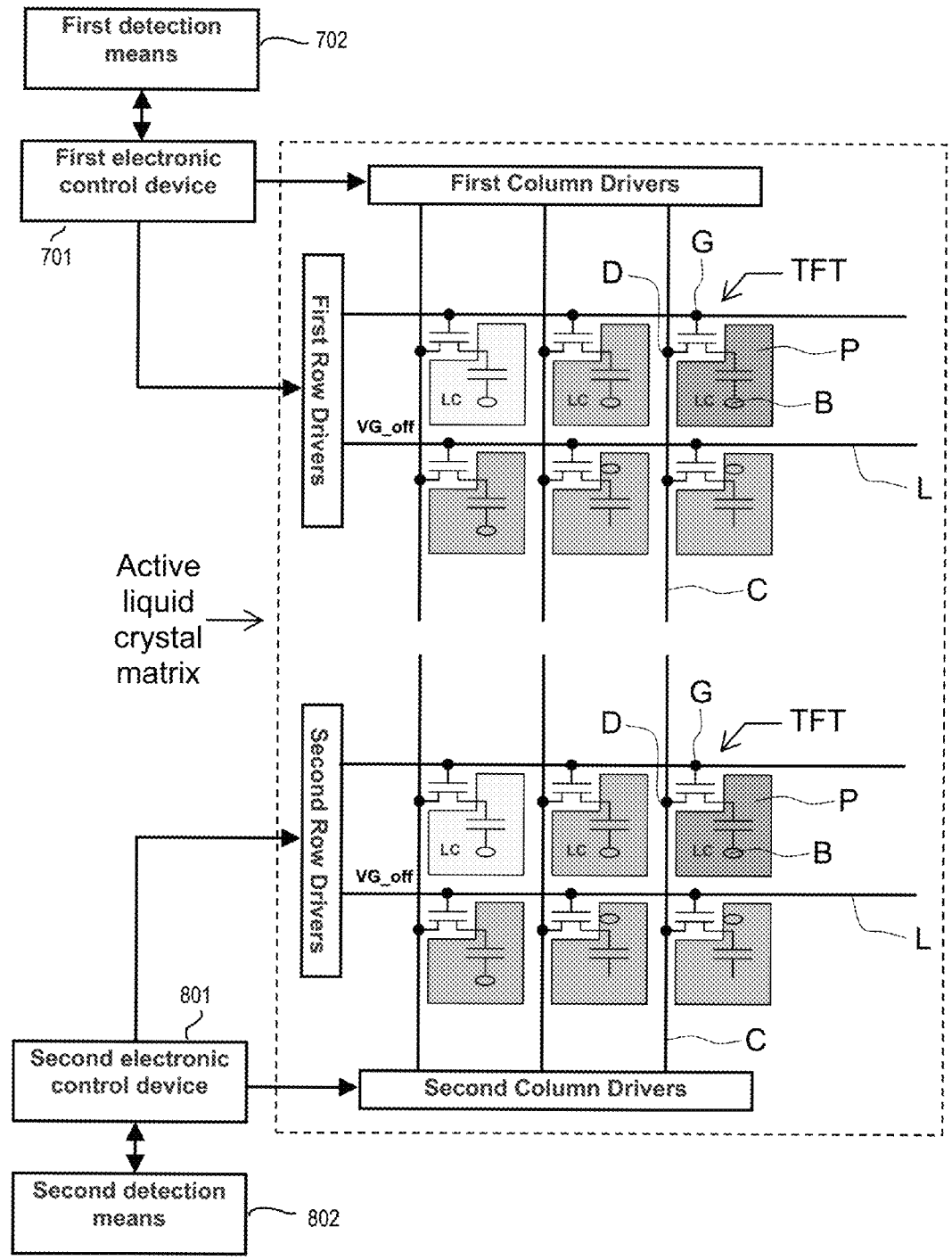
FIG. 8 shows a dual display device according to one embodiment.

Thus, in the display system of FIG. 3, the failure of the display of the half-screen $D2_G$ resulted both in the appearance of the white screen and the loss of the so-called "PFD" information display, information that is essential for piloting. In the case of the display system of FIG. 6, the failure of the display of the half-screen $D2_G$ results in both the appearance of the much more ergonomic black screen and the reconfiguration of the so-called "PFD" information display on the still-functional part $D2_G$ of the display LCD2.

What is claimed is:

1. A display device comprising an active liquid crystal matrix of twisted nematic type,
    said matrix comprising a first set of pixels, a first set of rows and of columns and a first electronic control device coupled to the first set of pixels,
    each pixel being controlled by a transistor comprising a source, a drain and a gate, the gate being linked to a row, the drain to a column and the source to the control electrode of the pixel,
    a voltage "boost" converter applying first voltages to each control row, the first voltages being either a switch-on voltage VG_on sufficient to switch on the transistors, or a switch-off voltage VG_off sufficient to switch off the transistors,
    a GMA voltage applied to each column being dependent on the predetermined optical transmission of the pixel, the GMA voltage being produced by a resistor bridge,
    the display device comprising first means for detecting the correct operation of the first electronic control device,
    wherein, in case of detection of incorrect operation of the first electronic control device, the display device comprises first cut-off means arranged so as to force to zero the switch-off voltages VG-on and VG_off of all the rows and the GMA voltages of all the columns, the cut-off means for resetting to zero the voltages VG_on and VG_off blocking the voltages of the "boost" converter, the cut-off means for resetting to zero the GMA voltages isolating the resistor bridge from a power supply voltage and connecting the resistor bridge to a ground, so that the transmission of all the pixels of the first set is minimum.

2. Display device according to claim 1, wherein the device is dual, that is to say that the liquid crystal matrix comprises:
    a second set of pixels, a second set of rows and of columns, a second electronic control device coupled to the second set of pixels, second detection means and second cut-off means independent of the first set of pixels, of rows, of columns, of the first electronic control device and of the first cut-off means.

3. Display device according to claim 1, wherein the cut-off means are transistors arranged between the power supply circuits of the rows and of the columns and the electrical ground, said transistors being controlled by the first and/or the second correct operation detection means, the voltage "boost" converter being blocked by three transistors, the first of the transistors arranged at the input of the converter which isolates the converter from the power supply voltage, the other two of the transistors arranged on the two output channels VG_on and VG_off of the converter which are connected to the ground, the power supply voltage for the resistor bridge being cut off by means of two transistors which isolate the resistor bridge from the power supply voltage and which connects the resistor bridge to the ground.

4. Display device according to claim 1, wherein the correct operation detection means comprise means for detecting fixed images, an image corresponding to all the voltages applied to the different pixels during an individual display time.

5. Display device according to claim 1, wherein the correct operation detection means comprise means for checking current consumption of the rows and/or control columns.

6. Display device according to claim 2, wherein the cut-off means are transistors arranged between the power supply circuits of the rows and of the columns and the electrical ground, said transistors being controlled by the first and/or the second correct operation detection means, the voltage "boost" converter being blocked by three transistors, the first of the transistors arranged at the input of the converter which isolates the converter from the power supply voltage, the other two of the transistors arranged on the two output channels VG_on and VG_off of the converter which are connected to the ground, the power supply voltage for the resistor bridge being cut off by means of two transistors which isolate the resistor bridge from the power supply voltage and which connects the resistor bridge to the ground.

7. Display device according to claim 2, wherein the correct operation detection means comprise means for detecting fixed images, an image corresponding to all the voltages applied to the different pixels during an individual display time.

8. Display device according to claim 2, wherein the correct operation detection means comprise means for checking current consumption of the rows and/or control columns.

* * * * *